Patented Feb. 6, 1923.

1,444,178

UNITED STATES PATENT OFFICE.

ADOLPH D. FEST, OF CHICAGO, ILLINOIS.

METHOD FOR COMMERCIALLY OBTAINING WATER-SOLUBLE MILK ALBUMEN AND MILK SUGAR.

No Drawing. Application filed June 10, 1921. Serial No. 476,596.

*To all whom it may concern:*

Be it known that I, ADOLPH D. FEST, a citizen of the United States, residing at Chicago, Cook County, Illinois, have invented or discovered a certain Method for Commercially Obtaining Water-Soluble Milk Albumen and Milk Sugar, of which the following is a specification.

Heretofore it has been customary to obtain milk albumen from whey chiefly by means of coagulation through heat. The albuminous product thus obtained has, however, been rendered insoluble by the heat and is of less value than it would be in water-soluble form. Milk sugar has heretofore been obtained ordinarily by further treatment of the product after removing the coagulated albumen. The object of the present invention or discovery is to provide a commercial method for obtaining the more valuable water soluble albumen, and in a simple, cheap and expeditious way, and at the same time to obtain the milk sugar.

The present invention or discovery has more particular importance in connection with the obtaining of water-soluble albumen and milk sugar from the by-product of cheese manufacture known as whey. This by-product at the present time has little commercial value and is usually either thrown away or fed to stock. The invention or discovery however is not limited to the use of whey, as whole milk, skimmed milk, buttermilk, etc., may be used.

In carrying out the present method I first take the milk product and obtain the solid constituents thereof in a dry or substantially dry form (and by this I mean to include the product in a pasty consistency) and by a method which does not render the albumen insoluble.

It is well known that albumen is rendered insoluble, when in the presence of moisture, as in milk, at a temperature of about 138° F. and the method of obtaining the dry or substantially dry albuminous product must not include the presence of heat or any other agency which will render the albumen insoluble in water. The preferred method of obtaining the dry or substantially dry albuminous product is by spraying the albumen-containing liquid, as whey, into a desiccating chamber from which the water content is carried away leaving the dry or substantially dry product for collection. There have been heretofore many such desiccating devices or systems suggested and put into practical use and no particular description of any of them is required here.

After obtaining the dry or substantially dry albumen-containing product it is placed in a container and a limited amount of water is added. This dry or substantially dry product contains albumen, milk sugar, some fat and certain inorganic salts. If whole milk were used the proportion of fat would of course be greater. When whey or buttermilk is used the amount of fat is relatively small. The presence of the fat is however of secondary importance with respect to the method herein disclosed.

The milk sugar and the albumenous product when so obtained in dry or substantially dry form are both water-soluble, but in different degrees. That is to say milk sugar will dissolve in about five times its weight in water at ordinary temperatures and in about two and one-half times its weight in water at boiling temperature. On the other hand the albumen will dissolve in about an equal amount of water by weight at ordinary temperatures, and since the employment of heat is undesirable my present method contemplates the use of water which is of a temperature at least materially below that at which the albumen would be rendered insoluble. Water at ordinary temperatures, say between sixty to eighty degrees F. will usually be employed.

If, for instance, the amount of albumen in the mass of dry or substantially dry product obtained as hereinabove pointed out is say ten pounds then about ten pounds of water would be added to it in the container and the several substances thoroughly mixed together. This mixture is then allowed to stand for a sufficient time to permit solution of the albumen by the water. Since an excess of time within reasonable limits will do no harm the mixture may stand an hour or more to insure substantially complete solution of the albumen.

The water containing the dissolved albumen is then separated from the rest of the mixture in any approved way, not including heat of a sufficient degree to render the albumen insoluble. Ordinarily the albumen solution may be obtained by expressing it, but preferably by the use of a centrifugal separator.

The solid albumen may then be separated from the solution in any approved way. It may be done by slow evaporation which does not include a temperature sufficient to render the albumen insoluble, but preferably by the same kind of desiccation, by spraying into a chamber, as hereinabove referred to.

In cases where a material amount of fat is present and appears with the albumen solution such fat may be removed according to methods well understood, as by a second centrifugal operation, the use of chemicals, etc.

The product left in the centrifugal machine after obtaining the water solution of the albumen is substantially milk sugar plus some inorganic salts, and thus by a single and simple process the valuable milk sugar is also obtained. This milk sugar product may be refined if desired but for many purposes it may be used as it comes from the separating machine.

In this connection it may be pointed out that when only such a limited amount of water is employed as a solvent for the albumen, as hereinabove described, the inorganic salts present have a precipitating action upon the milk sugar present, and the sugar crystallizes, absorbing, of course, a small amount of water for the crystallization. These crystals of sugar are only difficultly soluble in the water present on account of the presence of the inorganic salts. The sugar is, so to speak, "salted out" by these inorganic salts after the manner of "salting out" in soap making, and remain undissolved. The albumen is not thrown down, but remains in solution.

I claim:

1. The method of commercially obtaining water-soluble milk albumen and milk sugar, which consists in first obtaining albumen-containing constituents of the milk product in substantially dry form and without the application of such heat as will render the albumenous product thereof insoluble, leaching out the soluble albumenous product with substantially only such an amount of water as will dissolve substantially all of the albumenous product while leaving substantially all of the milk sugar undissolved, and separating the albumenous product from the albumenous solution in any approved way.

2. The method of commercially obtaining solid water-soluble milk albumen and milk sugar, which consists first in taking a milk product substantially freed from the butter fat, obtaining albumen-containing constituents thereof without the application of such heat as will render the albumen thereof insoluble, leaching out the albumen with substantially only such an amount of water as will dissolve substantially all of the albumen while leaving substantially all of the milk sugar undissolved, and dehydrating the albumenous solution obtained.

3. The method of commercially obtaining solid water-soluble milk albumen and milk sugar, which consists first in taking the whey left after the manufacture of cheese, obtaining albumen-containing constituents thereof without the application of such heat as will render the albumen thereof insoluble, leaching out the albumen with substantially only such an amount of water as will dissolve substantially all of the albumen while leaving substantially all of the milk sugar undissolved, and dehydrating the albumenous solution obtained.

ADOLPH D. FEST.